INVENTOR.
PHILIP E. CARON
ATTORNEYS

United States Patent Office 3,213,549
Patented Oct. 26, 1965

3,213,549
STEAMING APPARATUS
Philip E. Caron, 1644 22nd Ave., Longview, Wash.
Filed Feb. 20, 1963, Ser. No. 259,827
1 Claim. (Cl. 34—145)

This invention relates to a steaming apparatus. More specifically, this invention relates to a restrained steamer for uniformly steaming a moldable wood fiber mat prior to forming the mat into a finished contoured part.

There are many classes of moldable materials on the market today. One of these classes is manufactured by the Weyerhaeuser Company, of Tacoma, Washington, and sold under the trade name of "Pres-Tock."

This product generally comprises a quantity of comminuted cellulose material, preferably difiberized lignocellulose. This mixed with about 10% to about 40%, by weight of thermoplastic binder and about 1% to 15% by weight of a thermosetting resin. Preferably about 10% of the thermoplastic binder is used. The resulting molding mixture then is felted into a mat and prepressed to an intermediate compressed moldable fiber mat which has a density of at least about 20 lbs. per cu. ft. This intermediate mat is subjected to the action of steam and other hot aqueous vapors and is formed to a preselected shape.

A variety of comminuted cellulose materials may be used as starting materials in the practice of the present invention. Although suitable materials include sawdust, shavings, wood flour, and various chemically produced cellulose pulps, it is preferred to employ defiberized lignocellulose. This may be derived from any suitable source such as cane, straw, the bark of trees, and the like, but preferably it is derived from the wood of trees of various species.

The resinous binder system as a class used singly or in admixtures with each other are suitable for the purposes of the present invention, the particular binder employed being determined by the properties of the strength, hardness, surface qualities, etc. desired in the molded product. Such materials include, for example, the various grades of asphalt and gilsonite; the thermoplastic cellulose ethers, including ethyl cellulose, benzyl cellulose and the like; the thermoplastic cellulose esters, such as cellulose acetate; the thermoplastic coumarones; the thermoplastic coumaroneindene resins; the thermoplastic polyvinyl resins, including polyvinyl acetate, polyvinyl chloride and co-polymers thereof; the thermoplastic alkyd; the thermoplastic polystyrenes; and rosin. The condensation products of urea and an aldehyde and of a phenol and an aldehyde, for example, the phenol-formaldehyde resins, which at least in the preliminary stages of the pressing operation are thermoplastic in properties, are suitable as the thermosetting resins.

In general, this product is manufactured by the following process:

Step 1: Selecting sound whole wood for chips.

Step 2: Defiberizing the chips under carefully controlled conditions. This includes treating the chips with steam under carefully controlled pressure and temperature.

Step 3: Adding a selected thermoplastic and thermosetting resin binder system to the hot, moist fibers.

Step 4: Drying the fiber-resin mixture under carefully controlled conditions which includes the humidity under which the drying process is carried out to prevent curing of the thermosetting resin.

Step 5: Continuously felting the dried fibers into a thick, low density mat.

Step 6: Predensifying the continuous mat to facilitate handling, shipping and conversion.

Step 7: Cutting the mats into piece sizes required by the converter and the ultimate consumer.

Step 8: Palletizing the pieces for shipment.

Because this material can be readily formed into various shapes and has relatively high-strength characteristics and a relatively low cost per unit, it has enjoyed substantial commercial success.

When forming the above-noted wood fiber mat, it is first placed in a steam atmosphere for a period of from 5-60 seconds at a predetermined temperature and pressure. This steam atmosphere imparts the degree of formability necessary to form the mat into the contour desired. The moldable wood fiber mat is then removed from the steam atmosphere and placed in matched metal dies and then subjected to heat and pressure to cure the mat into a rigid part having the desired contour.

Difficulties have arisen in steaming the moldable wood fiber mat prior to forming it. The conventional steaming boxes introduce uncontrollable variables into the operation of conditioning the moldable wood fiber mat. In these steaming boxes the moldable wood fiber mat is unrestrained in the steam atmosphere and is free to expand to any density. The density and moisture content of the moldable wood fiber mat prior to entering the steam atmosphere, the steam pressure and temperature that is maintained within the steam box and ambient conditions in which the moldable wood fiber mat is stored influence the conditioned density of the wood fiber mat. These uncontrolled variables are not conducive to establishing maximum control over the subsequent molding operations. The formability of the product and the properties of the formed part are affected by the variable density of the conditioned wood fiber mat.

I have discovered that consistent uniform conditioning of the moldable wood fiber mat can be achieved by placing the moldable wood fiber mat in a restrained or pressure steamer. In this steamer, the mat is restrained between a movable steam platen and a stationary steam platen. The clearance between the platens, hence the density of the steamed moldable wood fiber mat, is established by stops. The moldable wood fiber mat is restrained from expanding to varying densities through the action of a pressure cylinder. With this apparatus, the moldable wood fiber mats are uniformly conditioned time after time, yielding consistent performance of the moldable wood fiber mats.

An object of this invention is to provide a restrained steaming apparatus for moldable wood fiber mats.

Another object of this invention is to provide a restrained steaming apparatus for conditioning a moldable wood fiber mat uniformly and consistently time after time.

An object of this invention is to provide a conditioning apparatus for a moldable wood fiber mat which functions to maintain a constant density on each piece of mat placed into the steamer.

These and other objects and advantages will become manifestly clear to those skilled in the art when taken in conjunction with the detailed description and drawings, wherein.

Figure 1:
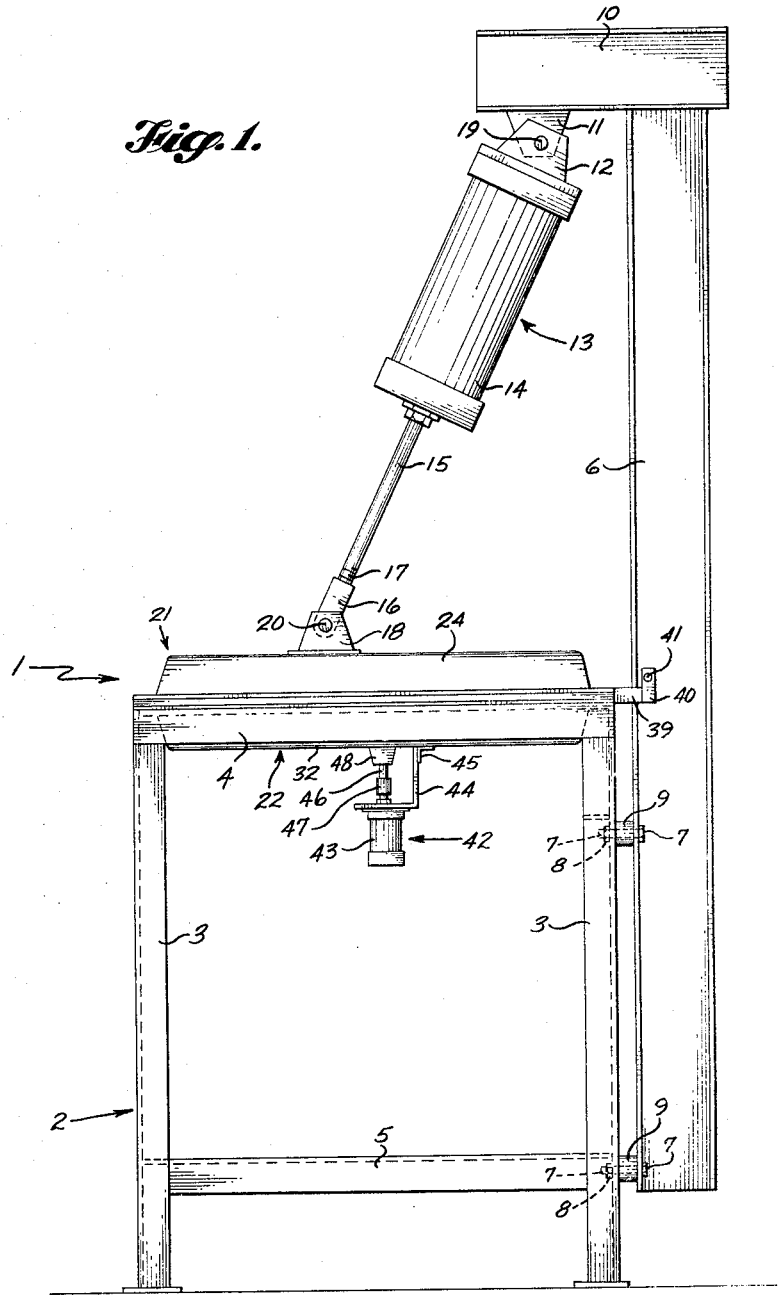
FIGURE 1 is a side elevation of the restrained steamer.

Referring to the drawings, the restrained steamer is generally indicated at 1. The restrained steamer 1 is supported by a table-like member generally indicated at 2 and is comprised of vertical legs 3 and upper and lower horizontal cross arms 4 and 5. Rigidly attached to one side of the table-like member 2 is an elongated vertical I-beam support member 6. The support member 6 is attached to one of the legs 3 by bolts 7 and nuts 8, as shown, with a spacer 9 between the support member 6 and leg 3. Rigidly secured to the upper end of the support member 6 is a horizontal motor support member 10 having an eye bracket 11 rigidly attached thereto.

Pivotally connected to the eye bracket 11 is a hydraulic motor means 13 which comprises a cylinder 14 rigidly attached to the eye bracket 11 through the mechanism of a motor yoke member 12 having a pivot pin 19 extending therethrough to connect the motor 13 to the eye bracket 11.

The motor means 13 generally comprises a cylinder 14 and a piston, not shown, which is in turn connected to a piston rod 15. The cylinder 14 is adapted to receive fluid pressure from a source, not shown, such as air, which functions to reciprocate the piston, not shown, and accordingly the piston rod 15 therewith.

The lower end of the piston rod 15 has connected thereto a rod eye bracket 16 by threads 17. The rod eye bracket 16 is in turn connected to a rod yoke 18 by pivot pin 20. The rod yoke 18 is welded or otherwise connected to an upper steam platen generally indicated at 21.

Mounted on top of the table 2 is a stationary platen member designated generally at 22. Mounted adjacent to the stationary platen 22 is the movable steam platen generally indicated at 21. The upper movable platen member 21 is adapted to be moved up and down by the hydraulic motor 13 and is pivotally mounted on a pivot pin 41 connecting support member 6 and arm members 39 and 40 which are rigidly attached to the platen 21.

Figure 2:
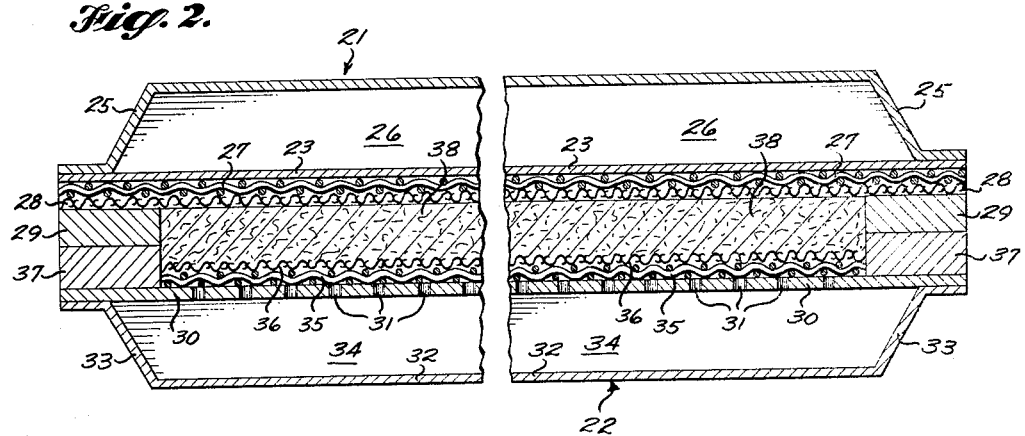
FIGURE 2 is a cross-sectional view of the upper and lower platens.
Figure 3:
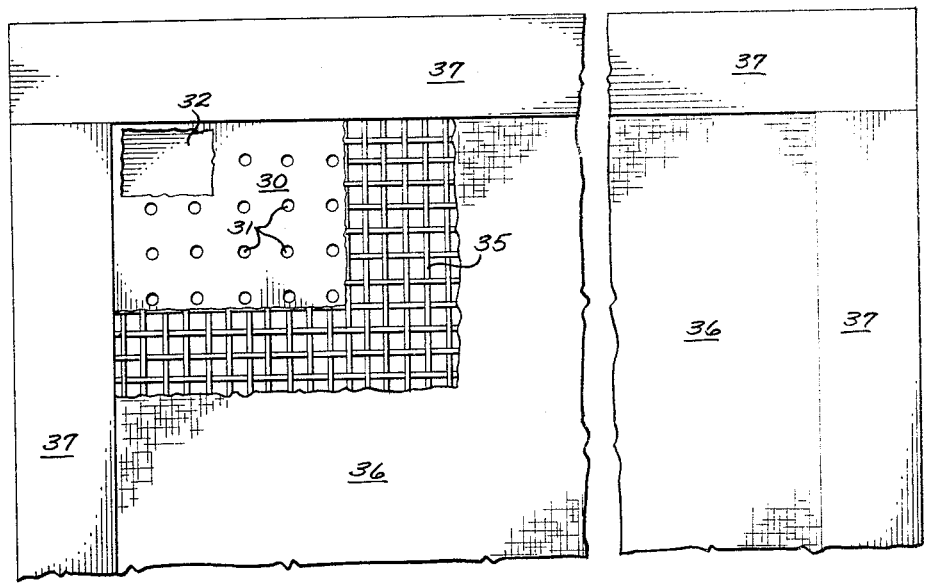
FIGURE 3 is a plan view of the lower platen with portions thereof broken away to show the internal details.

As shown more clearly in FIGURES 2 and 3, the upper and lower platen members 21 and 22 are adapted to receive a moldable wood fiber mat 38 therebetween.

The upper platen 21 is generally comprised of a flat plate member 23 that extends entirely across the surface of the moldable wood fiber mat 38. Spaced above the plate member 23 is another plate 24 bent at its end portions 25 and rigidly connected to the plate 23 to form a steam chamber 26. The chamber 26 is adapted to receive steam or other suitable heating means to heat the plate 23, if desired. Attached to the underside of the plate member 23 is a coarse wesh wire screen 27 having from 4 to 8 wires per inch. A nylon covering cloth or fabric 28 is provided over the screen 27 for a purpose to be hereinafter set forth. Spaced around the entire outer edge of the platen member 21 are spacer blocks 29 that cooperate with spacer blocks 37 on the lower platen member 22 to provide a space for the moldable wood fiber part 38.

The lower platen member 22 is generally comprised of a flat plate member 30 having a plurality of openings or holes 31 therethrough. Spaced from plate member 30 is another plate member 32 bent at its end portions 33 and rigidly attached to the plate member 30 to provide a chamber 34 therebetween. Rigidly attached to the plate member 30 is a coarse wire mesh screen 35 having from 4 to 8 wires per inch and covering the wire screen 35 is another nylon cloth or fabric 36 for a purpose to be hereinafter described.

As shown in FIGURE 3, the platen member 22 is of a rectangular configuration with the spacer bars 37 extending entirely around the periphery thereof. However, it should be pointed out that the rectangular configuration is for illustrative purposes only and can be in any configuration desired.

As shown in FIGURE 1, a support beam 45 is rigidly attached to the plate member 32 of the lower platen 22 and a motor hanger 44 is rigidly connected to the support beam 45 which supports a motor means 42.

The motor means 42 is generally comprised of a cylinder 43 having a piston, not shown, therein and is adapted to receive air from a pressure source, not shown, to reciprocate the piston within the cylinder 43. The piston, not shown, is in turn connected to a piston rod 46 which operates a poppet valve 48 connected into the lower platen 22 which supplies steam to the chamber 34. As shown, the piston rod 46 extends through a bushing 47 to provide an airtight seal.

In describing the operation of the apparatus, it will be assumed that the upper movable platen 21 is in its down or closed position. Moreover, it will be assumed that steam under pressure is in communication with the poppet valve 48.

When it becomes desirable to condition a piece of moldable wood fiber mat 38, motor means 13 is actuated to raise the movable platen 21 to an upper or raised position. A piece of moldable wood fiber mat 38 of a predetermined size is then fitted onto the lower stationary platen member 22 between the spacer blocks 37. The motor means 13 is then actuated to lower or close the upper movable platen member 21 to the position as shown in FIGURE 1.

With the upper or movable platen member 21 in its closed position, the motor means 42 is actuated to open the poppet valve 48. Steam under a predetermined pressure and temperature then is allowed to flow into the chamber 34 in the lower platen member 22 for a predetermined length of time.

The steam within chamber 34 then flows through the holes or openings 31 and through the coarse screen 35. The screens 27 and 35 prevent the moldable wood fiber mat 38 from engaging the platen members 23 and 30. The steam passes up through the moldable wood fiber mat 38 and through the upper nylon cloth 28 and out the sides of the upper platen member 21 through the screen 27. The coarse screens 27 and 35 together with the nylon covers 28 and 36 serve to diffuse the steam so that it passes through the mat 38 and heat it uniformly. In the absence of the screens 27 and 35 and covers 28 and 36, the mat 38 would contact the platens 21 and 22 and would dry the mats 38 which is undesirable.

With this construction, each moldable wood fiber mat 38 placed in the apparatus is uniformly steamed consistently time after time.

It should be noted that the moldable wood fiber mat 38 can only expand a predetermined amount as determined by the spacer blocks 29 and 37. The nylon covers 28 and 36 serve to keep the moldable wood fiber mat 38 from becoming stuck to the coarse screens 27 and 35. In this manner, the moldable wood fiber part 38 can be readily removed from the lower stationary platen 22 when the steaming is completed.

After the poppet valve 48 has been open for a predetermined period of time and it is determined that the moldable wood fiber mat 38 is completely steamed, the poppet valve 48 is closed by the hydraulic motor 42 and the motor means 13 is actuated and the upper movable platen 21 is then raised or opened. The moldable wood fiber mat 38 can now be removed from the lower platen member 22 and transferred to a standard molding die.

While the above described apparatus relates to the mat 38 receiving steam from the lower platen member 22, it should be pointed out that the apparatus can be readily modified so that the mat 38 can receive steam from either platen member 21 or 22 or both, as desired.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

I claim:

A restrained steamer for conditioning a moldable wood fiber mat with steam, comprising a first platen member having a chamber adapted to be communicated with a source of steam and having openings defined in one of its more extensive surfaces communicating with said chamber a second platen member being spacially displaced from and having an opposing parallel surface movable to and away from said extensive surface of said first platen member rigid unyielding spacer means interposed between and engaging said first and second platen members to provide a fixed minimum distance between said opposed surfaces thereof said fixed distance between said opposed platen surfaces being adapted to be greater than the thickness of said mat prior to its being positioned between said first and second platen members and adapted to be equal to the desired thickness of said mat after it has been subjected to steam injection and expanded thereby.

References Cited by the Examiner
UNITED STATES PATENTS

| | | | |
|---|---|---|---|
| 2,321,756 | 6/43 | Kyle | 34—145 |
| 2,453,568 | 11/48 | Calleia | 34—145 X |
| 2,944,291 | 7/60 | Prior et al. | 34—16 X |

WILLIAM F. O'DEA, *Primary Examiner.*

NORMAN YUDKOFF, *Examiner.*